July 24, 1923.
M. O. BERG
SPEED CHANGE WORM TRANSMISSION
Filed March 20, 1922 4 Sheets-Sheet 1
1,463,001
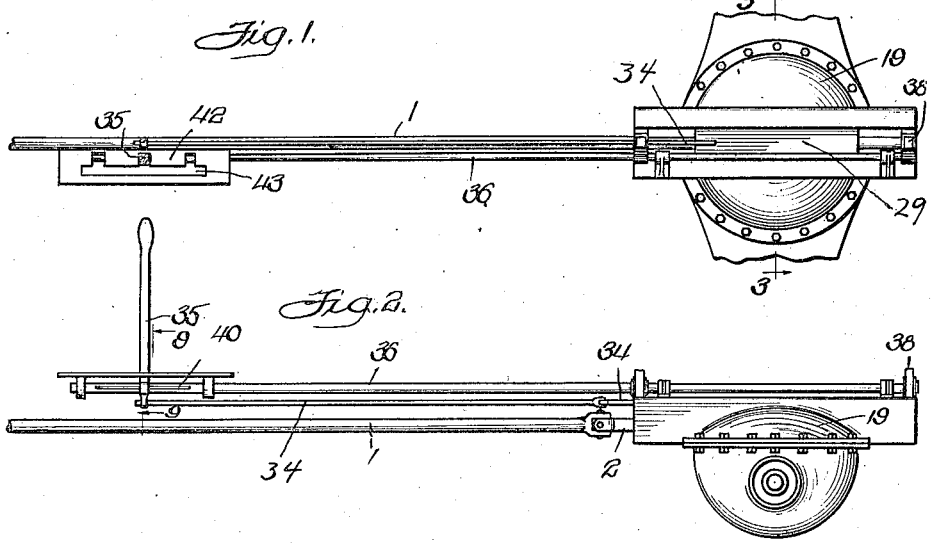
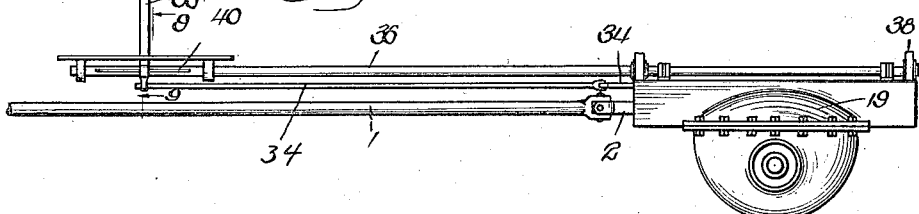
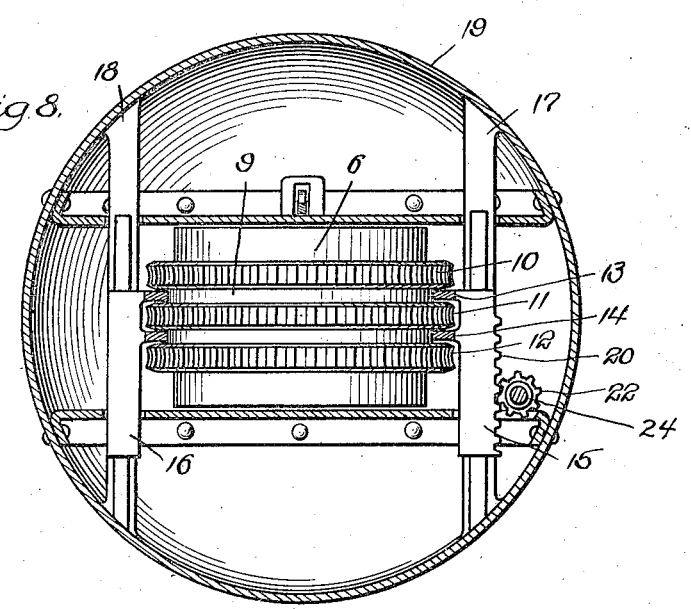
Witness:
W. K. Olson
Inventor:
Maurice O. Berg
By Albert Scheible, Atty July 24, 1923.

M. O. BERG

SPEED CHANGE WORM TRANSMISSION

Filed March 20, 1922      4 Sheets-Sheet 2

1,463,001

Inventor:
Maurice O. Berg
By Albert Scheible, Atty.

Witness:
W. T. Olson

July 24, 1923.

M. O. BERG 1,463,001

SPEED CHANGE WORM TRANSMISSION

Filed March 20, 1922    4 Sheets-Sheet 3

Inventor:
Maurice O. Berg
By Albert J. Schild, Atty

July 24, 1923.
M. O. BERG
SPEED CHANGE WORM TRANSMISSION
Filed March 20, 1922 4 Sheets-Sheet 4
1,463,001
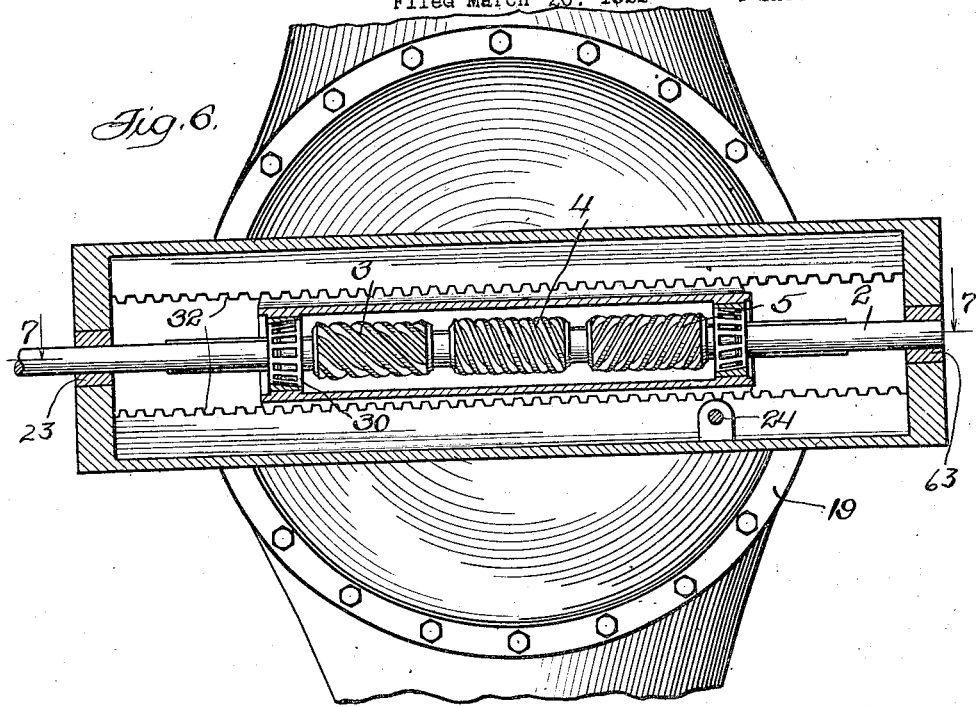
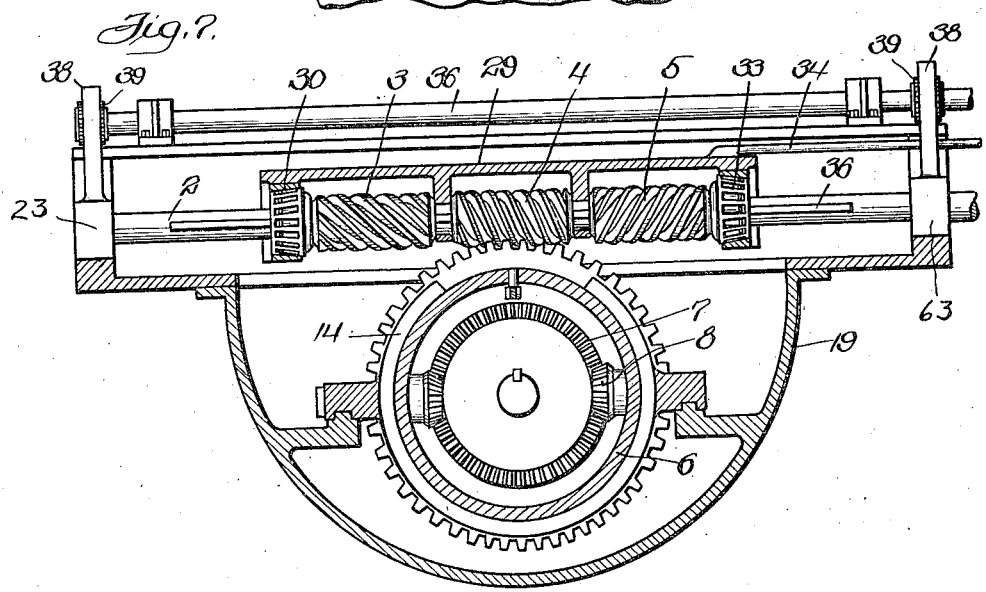
Inventor:
Maurice O. Berg
By Albert Scheith, Atty.
Witness:
U. K. Olson Patented July 24, 1923.

1,463,001

UNITED STATES PATENT OFFICE.

MAURICE O. BERG, OF CHICAGO, ILLINOIS.

SPEED-CHANGE WORM TRANSMISSION.

Application filed March 20, 1922. Serial No. 544,980.

*To all whom it may concern:*

Be it known that I, MAURICE O. BERG, citizen of the United States, residing at Chicago, in the county of Cook and State of Illinois, have invented certain new and useful Improvements in a Speed-Change Worm Transmission; and I do hereby declare the following to be a full, clear, and exact description of the invention, such as will enable others skilled in the art to which it appertains to make and use the same.

My invention relates to transmission mechanism of the general type designed for affording variable speeds and reversible directions, and in one of its general aspects aims to provide a mechanism of this class in which the variations in speed or direction are afforded by shifting the driving connection from one to another of suitably formed pairs of worm wheels, thereby securing the silent operation and long life of a worm drive and avoiding the breakage of gear teeth which is so common with geared speed-changing mechanisms. More particularly, my invention aims to provide an exceedingly simple, strong and easily manipulated arrangement of worm driving parts for a speed-changing transmission, aims to provide simple mean for moving the assemblage of worms into and out of engaging relation to the assemblage of worm wheels, aims to accomplish the simultaneous shifting of both the worms and the worm wheels, aims to provide simple and positive means for latching both the worms and the worm wheels in any one of their adjusted positions, and aims to provide unusually simple and effective means for automatically releasing the engagement prior to effecting the required shifting. It also aims to provide simple and effective means for resisting the thrust on the various parts and aims to provide a transmission mechanism of the class described which will be particularly suitable for use upon automobiles.

As applied to a transmission mechanism for automobiles, my invention aims to provide a speed-changing and reversing mechanism interposed between a driving shaft, such as the shaft of the engine, and desirably aims to accomplish its purpose by providing a jointly movable series of worms of different inclinations, each of which is adapted to mesh with the correspondingly formed one of a series of worm wheels mounted on the drum of the differential of the automobile. More particularly, my invention aims to provide simple means operable by the driver of the automobile for first moving the worms out of engagement with the worm wheel, then sliding the series of worms to bring any desired one of the same opposite the drum carrying the worm wheels and simultaneously shifting the group of worm wheels to bring the correspondingly formed one thereof opposite the worm with which it is designed for engagement, and thereafter bring the selected worm into engagement with the corresponding worm wheel. It also aims to provide simple and positive means for latching the group of worm wheels against sliding when in operative position, aims to provide means for automatically raising the worms out of engaging relation to any worm wheel when the control mechanism is unlatched to permit of the said shifting and for releasing the group of worms simultaneously therewith to permit a shifting thereof on the differential drum; aims to provide simple means for taking up the end thrust on the worm, and aims to provide means whereby the operator can readily predetermine the worm wheels which are to do the driving. Moreover, my invention aims to provide a strong, inexpensive and compact mounting for the various parts of the said mechanism and one which can readily be employed in connection with any standard type of differential. Still further and also more detailed objects will appear from the following specification and from the accompanying drawings, in which—

Fig. 1 is a plan view of a mechanism embodying my invention.

Fig. 2 is a side elevation of the same, taken from the lower side of Fig. 2.

Fig. 6 is a horizontal section on a reduced scale, taken along the correspondingly numbered line in Fig. 3.

Fig. 7 is a vertical and longitudinal section taken centrally of Fig. 6.

Fig. 8 is a horizontal section taken along the correspondingly numbered line of Fig. 5.

Figure 9:
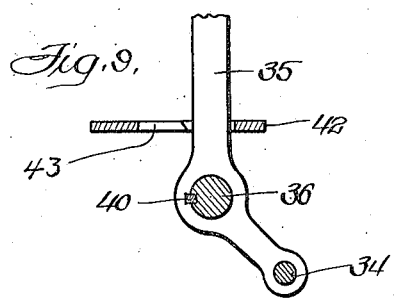
Fig. 9 is a vertical section taken along the correspondingly numbered line in Fig. 2, but drawn on an enlarged scale.

In accomplishing the purposes of my invention after the manner of the accompanying drawings, I provide a universal joint between the main portion 1 of the drive shaft (which may be the shaft of the engine) and an extension shaft portion 2 to which the group of worms is spliced, these worms being here shown as a high pitch worm 3, a low pitch worm 4 and a reverse pitch worm 5. The extension shaft portion 2 carrying these worms extends transversely of the drum 6 of the usual differential which differential is here shown as including bevel gears 7 and 8.

Slidably mounted on the surface of the drum 6 is a worm wheel member comprising a collar 9 having fast thereon three worm wheels 10, 11 and 12, which wheels are cut respectively for meshing with the worms 3, 4 and 5. This collar 9 is adapted to be slid upon the drum in either direction by thrust means which desirably are in the form of incomplete rings 13 and 14 fast upon a pair of slides 15 and 16. These slides are mounted respectively on guides 17 and 18 extending across the casing 19 of the differential and speed changing mechanism as shown in Fig. 8. To move the said slides in either direction, I provide one of them with a suitable rack formation adapted to be actuated conjointly with the means which slide the group of worms on the extension of the drive shaft. For this purpose, I am here showing the slide 15 as equipped with a rack 20 engaging a pinion 22 fast upon a vertical shaft 24. This shaft 24 has at its upper end an actuating pinion 27 which is continuously in mesh with a rack 26 extending along one edge of a bearing member 29 which is here shown as straddling the extension shaft 2 and which carries both the journals 23 and 63 for the extension shaft 2 and the thrust bearings 30 and 33 for taking up the end thrusts on the worms. When this rack member is in its normal position of Fig. 3, its outward lower edges rest upon ledges 31 which are rigid portions of the transmission casing 19 and which ledges stop the said rack member in a position in which the operated worm and worm wheel are amply intermeshed without unduly bearing against each other. So also, the bearings 23 and 63 which are slidably mounted for vertical movement in the casing 19 desirably rest upon portions of the latter, as shown in Fig. 7, when the parts are in their normal operative position. When in this position, the same rack or bearing member is interlocked against movement lengthwise of the shaft 2 by the interengaging of teeth formed respectively on this member and on the supporting portions adjacent to the said ledges 31, such as the teeth 32 of Fig. 3, thereby holding the bearing member and the worms carried by the latter against movement longitudinally of the drive shaft.

To shift the group of worms longitudinally for bringing any desired one of the worms opposite the center of differential drum and the worm wheel carried by the latter, I provide suitable means arranged for operation by the driver of the vehicle, such as a shifter rod 34 fastened to the bearing member 29 and leading to a lever 35 which is slidably mounted on a rock-shaft 36 as shown in Fig. 2. From this figure, taken in connection with Fig. 7, it will be obvious that if the group of worms is raised out of mesh with the worm wheels, a movement of the lever 35 either towards the right or towards the left in Fig. 2 will correspondingly slide the group of worms on the extension shaft 2, while still leaving these worms interlocked by the spline 36 of Fig. 7 with the shaft 2 against rotation.

Figure 3:
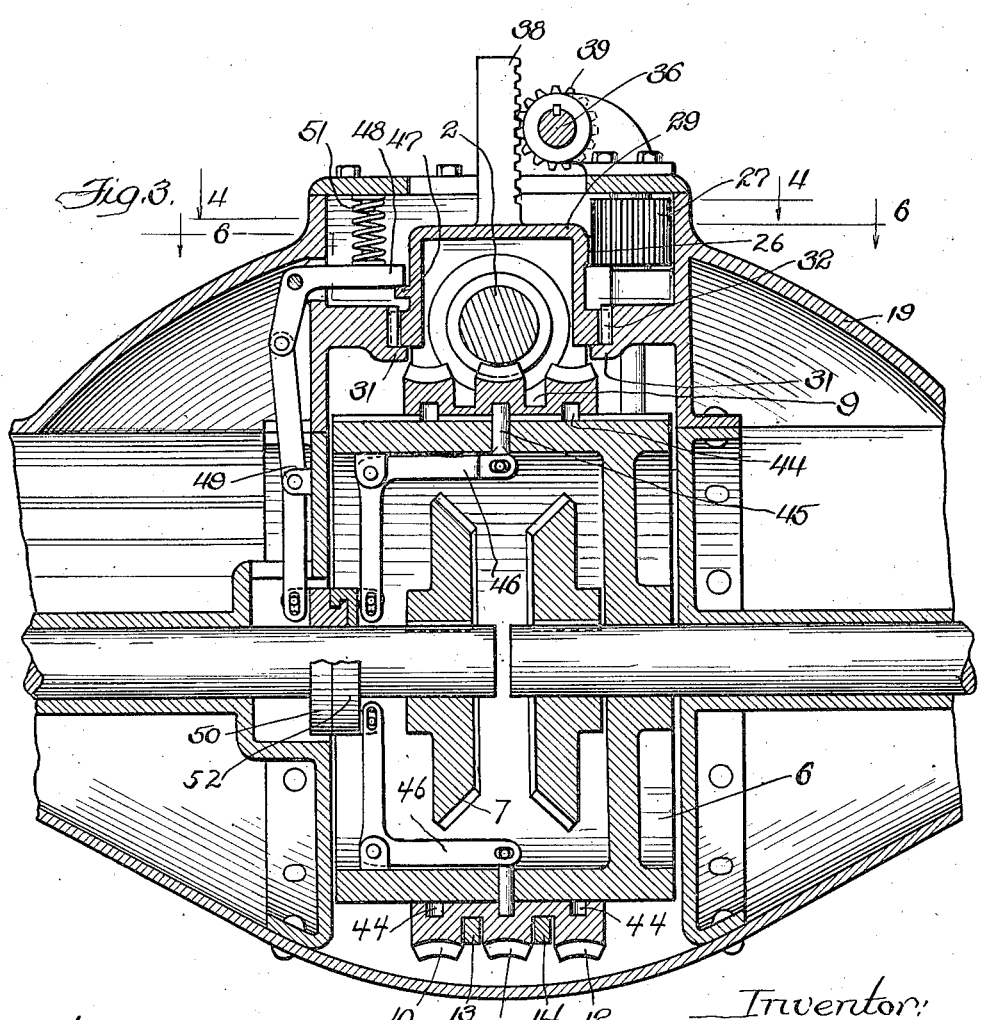
Fig. 3 is an enlarged and fragmentary transverse vertical section taken along the correspondingly numbered line in Fig. 1.
Figure 4:
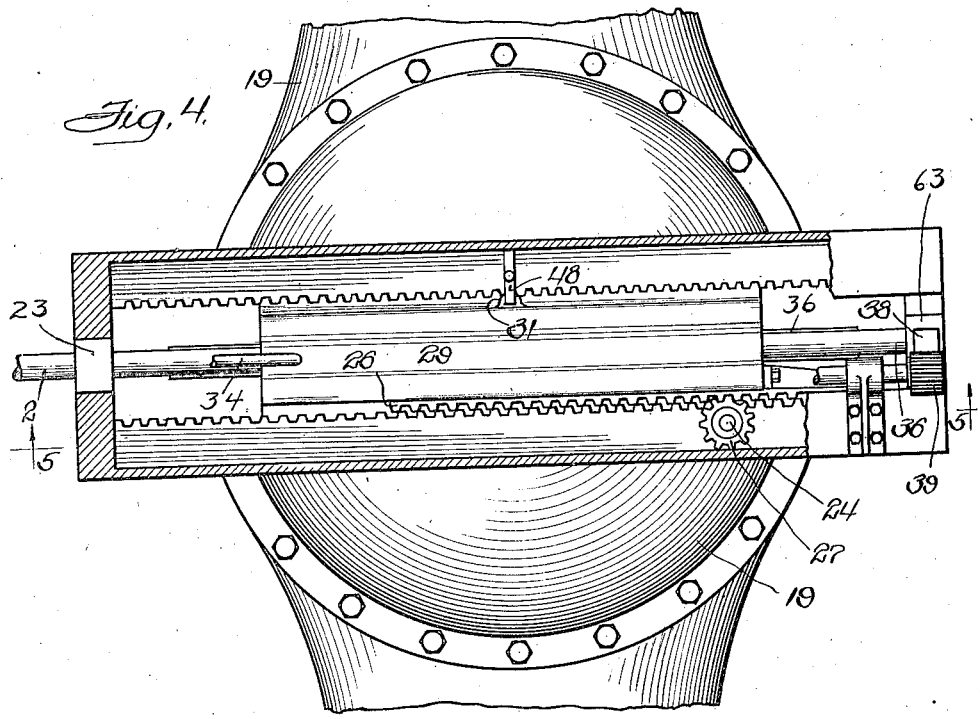
Fig. 4 is a horizontal section through the correspondingly numbered line in Fig. 3 but drawn on a reduced scale.
Figure 5:
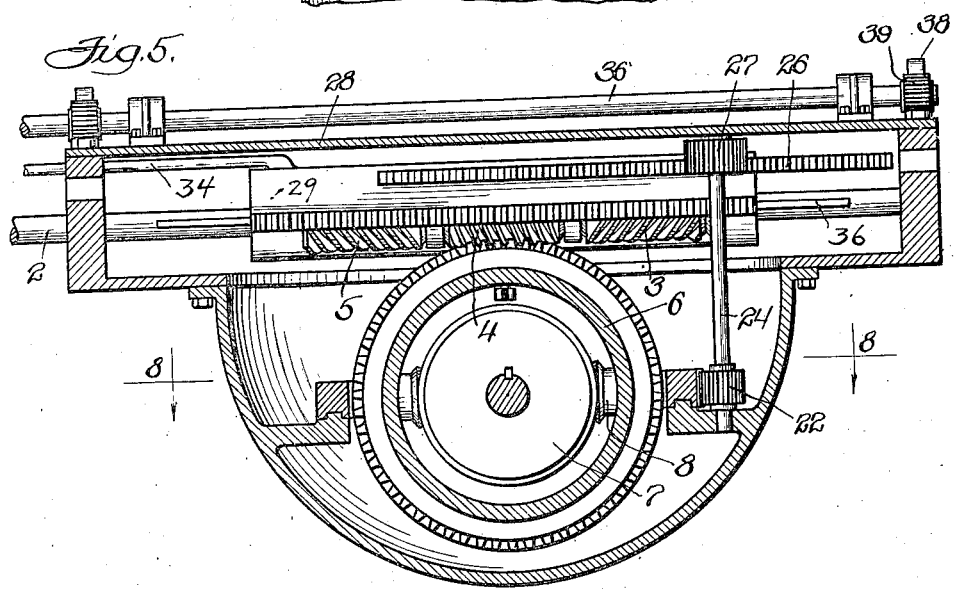
Fig. 5 is a vertical section taken along the correspondingly numbered line in Fig. 4.

To raise the group of worms for this purpose, I provide the bearing member 29 with an upwardly extending rack stem 38 as shown in Fig. 3, which stem has a lateral rack formation meshing with a pinion 39 on the control shaft 36 upon which the lever 35 is slidably mounted. This lever is splined to the shaft 36 by a spline 40 as shown in Fig. 2, so that a swinging movement of the lever about the axis of this shaft will rotate the shaft 36 and hence will turn the pinion 39 so as to raise or lower the rack stem 38 according to the direction in which the lever is swung. Consequently, if the lever is swung in a direction tending to rotate the pinion 39 in Fig. 3 in a clockwise direction, the rack stem 38 will be raised so as to lift the operating worm out of engagement with the worm wheel under it, thereby disengaging the interlocking teeth 32 on the bearing member and the transmission casing. When the lever has thus been rocked to lift the worms and to release the bearing member from the latching means which normally prevent a movement of the latter longitudinally of the extension shaft 2, a sliding of the lever 35 along the control shaft 36 will correspondingly move the bearing member so as to bring the selected worm vertically over the axis of the differential drum. While thus being moved longitudinally, the bearing member 29 through its rack 26 which engages the pinion 27 will rotate the vertical shaft 24 and hence will also rotate the pinion 22 which is mounted on the lower end of this shaft. Consequently, this pinion will actuate the rack 20 so as to move the slides which shift the worm wheel member 9 on the drum 6. By suitably proportioning the sizes of the pinions just mentioned, I can readily cause the extent of shifting of the worm wheel member 9 to be proportioned to the shifting of the bearing member which carries the worms, so that the movement which brings any one of the worms in proper position opposite the drum 6 will automatically shift the worm wheels to bring the correspondingly cut worm wheel into position under the selected worm.

To determine the amount of its shifting accurately, I provide suitable means adjacent to the lever 35, such as a latching plate 42 equipped with notches corresponding in spacing to the distance which the lever 35 must be slid along the control shaft 36 to effect the desired shifting. Thus, with the arrangement pictured, a central or low speed worm and worm wheel are in operative position when the lever is opposite the middle notch in the latching plate 42, while a movement of the lever towards the left-hand notch will shift the drive to the high speed, and a movement to the right-hand notch will shift it to the reverse. Then in each case a swinging of the lever out of the longitudinal slot 43 in the said latching plate into one of the said recesses will rotate the control shaft 36 and the pinion 39 carried by the latter, thereby lowering the rack stem 38 and the worm bearings so as to intermesh the selected worms and worm wheel and to latch the said bearing member against displacement.

To latch the worm wheels also against displacement, I provide the worm wheel member 9 on its inner face with suitably arranged bores 44, any one of which may be entered by a finger 45 on a latching lever 46 as shown in Fig. 3. Then I provide suitable means for transmitting the vertical movement of the bearing member 29 to this lever 46. For this latter purpose, I am here showing the bearing member as having a ledge 47 extending in the opposite direction from the rack teeth which engage the pinion 27, which ledge underhangs one arm of a bell-crank lever 48 connected through a rocking lever 49 and a pair of interlocked collars 50 and 52 to the latching lever 46. The arm of the lever 48 which projects over the ledge 47 is continuously urged downwardly towards that ledge by a spring 51, which spring acts through the said system of levers in continuously tending to force the pin 45 into its latching position of Fig. 3. However, when the bearing member is raised, the ledge 47 raises the adjacent arm of the lever 48 against the resistance of the spring, whereby it causes the said system of levers to withdraw the pin 45 out of its latching position, thereby releasing the group of worm wheels so that the latter can be slid longitudinally of the drum 6. Consequently, the raising and lowering of the bearing member by a rotational movement of the control shaft 36 also automatically unlatches and relatches the worm wheel member 9.

From the embodiment thus illustrated and described, it will be obvious that I can accomplish the purposes of my invention with a relatively simple mechanism and one which will readily permit the use of worms and worm wheels for the speed-changing members, thereby eliminating the stripping of teeth which has proven so troublesome and expensive in the speed changing mechanisms now in common use. However, I do not wish to be limited to the details of construction and arrangement here disclosed, it being evident that the same might be varied in many ways without departing either from the spirit of my invention or from the appended claims. Neither do I wish to be limited to the use of my transmission on automobiles, as it will be obvious that the same might be employed with equal facility for other purposes where a variable speed may be desired, either with or without a change in direction of the resulting movement.

I claim as my invention:—

1. A variable speed transmission, comprising a driving shaft having a plurality of worms of different inclinations longitudinally spaced thereon, a driven shaft carrying an equal number of worm wheels respectively adapted to engage the said worms, means for tilting the driving shaft to bring a worm into or out of engagement with a worm wheel, means including a slidable shifting rod for sliding the worm wheels on the driven shaft, means actuated by the sliding of the shifting rod, for sliding the worms on the driving shaft to bring any one of the worms opposite the driven shaft, and means actuated by a rotational movement of the shifting rod for operating the said tilting means.

2. A variable speed transmission, comprising a driving shaft having a plurality of worms of different inclinations longitudinally spaced thereon, a driven shaft having an equal number of worm wheels fast thereon and respectively adapted to engage the said worms, means for tilting the driving shaft to bring a worm into or out of engagement with a worm wheel, and cooperating means for simultaneously sliding the worms and the worm wheels longitudinally of their respective axis to bring any worms opposite the worm wheel adapted to intermesh with it; the said cooperating means comprising a pair of racks respectively associated with the worms and with the worm wheels, the racks extending transversely of each other, a pair of pinions respectively meshed with the two racks, and a pinion shaft fast on the two pinions.

3. A transmission mechanism comprising a driving shaft, a plurality of differently pitched worms arranged to be driven thereby an equal number of worm wheels formed respectively for meshing with the worms, means for relatively moving the worms and worm wheels to bring the axis of any one of the worms into the medial plane of the corresponding worm wheel, and means for relatively moving the worms and worm wheels to approach or separate their axis, and a control device having a lever movable in two transversely transverse directions for respectively operating the said two means, and means for latching the lever in any one of a number of positions corresponding respectively to the proper intermeshing positions of the worms and worm wheels, the last named means being arranged for preventing a complete movement in one of its said directions when the worms and worm wheels are not in one of their said proper intermeshing positions.

4. A variable speed transmission comprising a tiltably mounted shaft, a group of differently pitched worms slidably mounted on the shaft, a differential including a drum having its axis extending transversely of the axis of the said shaft, a group of worm wheels slidably mounted on the drum and respectively cut for meshing with the said worms, means operable when the shaft is tilted away from the drum for simultaneously sliding the worms on the shaft and sliding the worm wheels on the drum, and means operable by the tilting of the shaft towards the drum for latching both the worms and the worm wheels against sliding.

5. A variable speed transmission as per claim 4, in which the latching means include recesses on the interior of the worm wheels and a latching member projecting through the drum from the interior thereof and entering one of these recesses.

6. A variable speed transmission as per claim 4, in which the latching means include recesses on the interior of the worm wheels and a latching member projecting through the drum from the interior thereof and entering one of these recesses; in combination with a system of levers actuated in one direction by the tilting of the shaft and connected to the said latching member.

7. A variable speed transmission as per claim 4, in which the latching means include recesses on the interior of the worm wheels and a latching member projecting through the drum from the interior thereof and entering one of these recesses; in combination with a system of levers actuated in one direction by the tilting of the shaft and connected to the said latching member, and spring means for moving the system of levers and the latching member in the opposite direction.

8. A variable speed transmission comprising a group of worm wheels slidably mounted on a driven drum, an articulated driving shaft having a portion thereof extending past the said worm wheels, a group of worms slidably mounted on the said shaft portion and respectively formed for engaging the said worm wheels, a control shaft extending substantially parallel to the said articulated shaft, means actuated by a rotary movement of the control shaft for moving the said shaft portion towards or away from the worm wheels, and means slidable upon the control shaft for simultaneously sliding the worms on the articulated shaft and sliding the worm wheels on the drum.

9. A variable speed transmission comprising a group of worm wheels slidably mounted on a driven drum, an articulated driving shaft having a portion thereof extending past the said worm wheels, a group of worms slidably mounted on the said shaft and respectively formed for engaging the said worm wheels, a control shaft extending substantially parallel to the said articulated shaft, means actuated by a rotary movement of the control shaft for moving the said shaft portion towards or away from the worm wheels, and means slidable upon the control shaft for simultaneously sliding the worms on the articulated shaft and sliding the worm wheels on the drum; in combination with means operable by the movement of the articulated shaft towards the drum for latching both the worms and the worm wheels against sliding.

10. A variable speed transmission comprising a group of worm wheels slidably mounted on a driven drum, an articulated driving shaft having a portion thereof extending past the said worm wheels, a group of worms slidably mounted on the said shaft and respectively formed for engaging the said worm wheels, a control shaft extending substantially parallel to the said articulated shaft, means actuated by a rotary movement of the control shaft for moving the said shaft portion towards or away from the worm wheels, means slidable upon the control shaft for simultaneously sliding the worms on the articulated shaft and sliding the worm wheels on the drum; and separate means for limiting the approaching of the articulated shaft and of the operatively selected worm to the worm wheels.

11. A variable speed transmission comprising an articulated drive shaft, a group of differently pitched worms splined to the free end of the shaft, a group of correspondingly pitched worm wheels disposed adjacent to the said group of worms, means for moving the said end portion of the shaft toward and away from the group of worms, and means operable when the said shaft portion has been moved away from the group of worms for simultaneously shifting the group of worms and the group of worm wheels to bring any selected worm opposite the corresponding worm wheel; the said means comprising a carrier supporting the thrust bearings for the worms and having a rack thereon extending transversely of the said shaft, and a pinion engaging the said rack and fast upon a rockingly mounted control shaft.

12. A variable speed transmission comprising a group of differently pitched worms, a driving shaft upon which the said worms are splined, a bearing member in which the worms are journaled, a driven drum, a group of worm wheels slidable upon the drum and splined thereto and respectively formed for meshing with the said worms, the bearing member being mounted with freedom for movement towards or from the axis of the drum, a rack on the bearing member, and means including a pinion meshing with the said rack for moving the bearing member towards or away from the axis of the drum.

13. A variable speed transmission as per claim 12, in which the bearing member is mounted for movement longitudinally of the axis of the worms, and cooperating means upon the support and the bearing member for latching the latter against such longitudinal movement upon a movement of the bearing member towards the axis of the drum.

14. A variable speed transmission as per claim 12, in which the bearing member is mounted for movement longitudinally of the axis of the worms, a rack fast upon the bearing member and extending parallel to the axis of the worms, means for moving the bearing member parallel to the axis of the worms to bring a selected worm into operative position, and means including a pinion meshing with the said rack for causing a movement of the bearing member in the last named direction to effect a corresponding sliding of the worm wheels upon the drum.

Signed at Chicago, Illinois, March 18th, 1922.

MAURICE O. BERG.